United States Patent [19]

Fuller et al.

[11] Patent Number: 5,211,100
[45] Date of Patent: May 18, 1993

[54] INERTIAL WELDED CYLINDER AND METHOD OF MAKING SAME

[75] Inventors: Dennis A. Fuller; Patrick Heidrich, both of Bismarck, N. Dak.

[73] Assignee: Clark Equipment Company, South Bend, Ind.

[21] Appl. No.: 809,941

[22] Filed: Dec. 18, 1991

[51] Int. Cl.$^5$ .............................................. F16J 10/00
[52] U.S. Cl. ..................................... 92/169.1; 264/68; 264/248; 156/73.5; 228/112
[58] Field of Search ...................... 92/169.1, 231, 260; 156/73.5, 580.1; 228/112, 113, 114; 264/68, 248

[56] References Cited

U.S. PATENT DOCUMENTS

| | | |
|---|---|---|
| 2,853,118 | 9/1958 | Schnitzius . |
| 3,444,611 | 5/1969 | Bogart . |
| 3,596,570 | 8/1971 | Kenyon et al. ...................... 92/168 |
| 3,618,196 | 11/1971 | Sluetz ................... 29/470.3 |
| 3,690,088 | 9/1972 | Anderson et al. ...................... 53/29 |
| 4,303,005 | 12/1981 | Glomski et al. ........................ 92/52 |
| 4,832,769 | 5/1989 | Shantz et al. ...................... 156/73.5 |

FOREIGN PATENT DOCUMENTS 58989  4/1982  Japan ................................. 228/112

OTHER PUBLICATIONS

Metals Handbook, Ninth edition, copyrighted 1983, vol. 6, pp. 719-728 (call number TA (ref) 472.A3.C3).

Primary Examiner—Edward K. Look
Assistant Examiner—F. Daniel Lopez
Attorney, Agent, or Firm—Kinney & Lange

[57] ABSTRACT

A friction or inertial welded cylinder is made of a tube and base member. The base member has an annular groove that is positioned within the cylinder tube and which receives the kerf formed on the interior of the cylinder during welding. The groove height is formed to provide a place to receive the kerf as it curls and to seal material within the groove so foreign materials do not later break loose from the kerf and cause damage to the cylinder assembly in use.

4 Claims, 2 Drawing Sheets

INERTIAL WELDED CYLINDER AND METHOD OF MAKING SAME

BACKGROUND OF THE INVENTION

The present invention relates to an inertial friction welded fluid pressure cylinder that includes a cylindrical tube welded to a base. The base has a retaining groove that receives a kerf formed during inertial welding. The groove is of selected size to trap foreign materials generated during the inertial welding process to prevent such foreign material from entering the interior of the cylindrical tube.

Inertial welding of hydraulic cylinder parts is well known. Some prior cylinders utilize an interior groove around the end cap to which the cylindrical tube is welded as a flash trap. U.S. Pat. No. 4,832,769 illustrates a friction welding flash trap seal that includes an end cap that has a plug which fits into the cylinder tube and the cylinder is necked down onto the plug after welding for complete sealing. The present invention avoids the need for necking down the cylindrical tube onto the interior plug of the base.

U.S. Pat. No. 3,618,196 discloses a flash trap for friction welding of cylinders that utilizes a pair of off-set shoulders to attempt to trap the weld flash.

A friction welded hydraulic actuator is shown in U.S. Pat. No. 3,596,570. A simple butt weld is shown between tube and the end cap.

A friction welding method is also illustrated in U.S. Pat. No. 3,444,611. The use of friction to seal thermo plastic parts is described in U.S. Pat. Nos. 2,853,118 and 3,690,088.

Problems with the weld flash have been present, as the prior art shows, but none of the art discloses methods to quickly, efficiency, and reliably eliminate problems with weld flash and other foreign materials through the use of a recessed groove of selected, appropriate size.

SUMMARY OF THE INVENTION

The present invention relates to an inertial welded fluid pressure or hydraulic cylinder assembly, and a method of making the cylinder assembly wherein the cylinder base and the cylinder tube are welded together using inertial welding techniques. The end surface of the cylinder tube fits against and is welded to a shoulder surface on the base. The shoulder forms a head member or plug part of the base that fits inside the cylinder tube. An internal annular groove is provided around the plug, where it joins the shoulder. The groove size is selected so that when the base is rotated relative to the tube to cause friction or inertial welding, the kerf formed by flowing metal on the interior of the tube, will flow and curl so that it effectively seals relative to a top surface forming the groove to prevent significant foreign particles (greater in size than the permeable gap) from the welding process from entering the interior of the tube during subsequent use. The closure or seal is made without having the kerf contact the inner peripheral annular surface defining the interior of the groove.

While various methods can be used for attaining the necessary friction generated heat for welding, the relationship of the size of the kerf retaining groove to the kerf can be maintained so that the kerf or flash will curl into place and effectively block any weld debris or scale, slag, chips, slivers that form at the edges of the kerf or like foreign material which can break off during use from entering the interior of the cylinder and causing damage. The sealing is accomplished without any additional process steps other than the relative rotation used for the inertial welding. The parallel surfaces forming the annular groove are spaced to accommodate the kerf and permit no more than 0.010 inches clearance between the upper groove surface and the kerf. In order to obtain the sealing, the inner annular surface that defines the inner end of the groove is made deep enough so it will not interfere with formation of the kerf or flash as it curls during the inertial welding process.

DETAILED DESCRIPTION OF THE PREFERRED EMBODIMENTS

Figure 1:
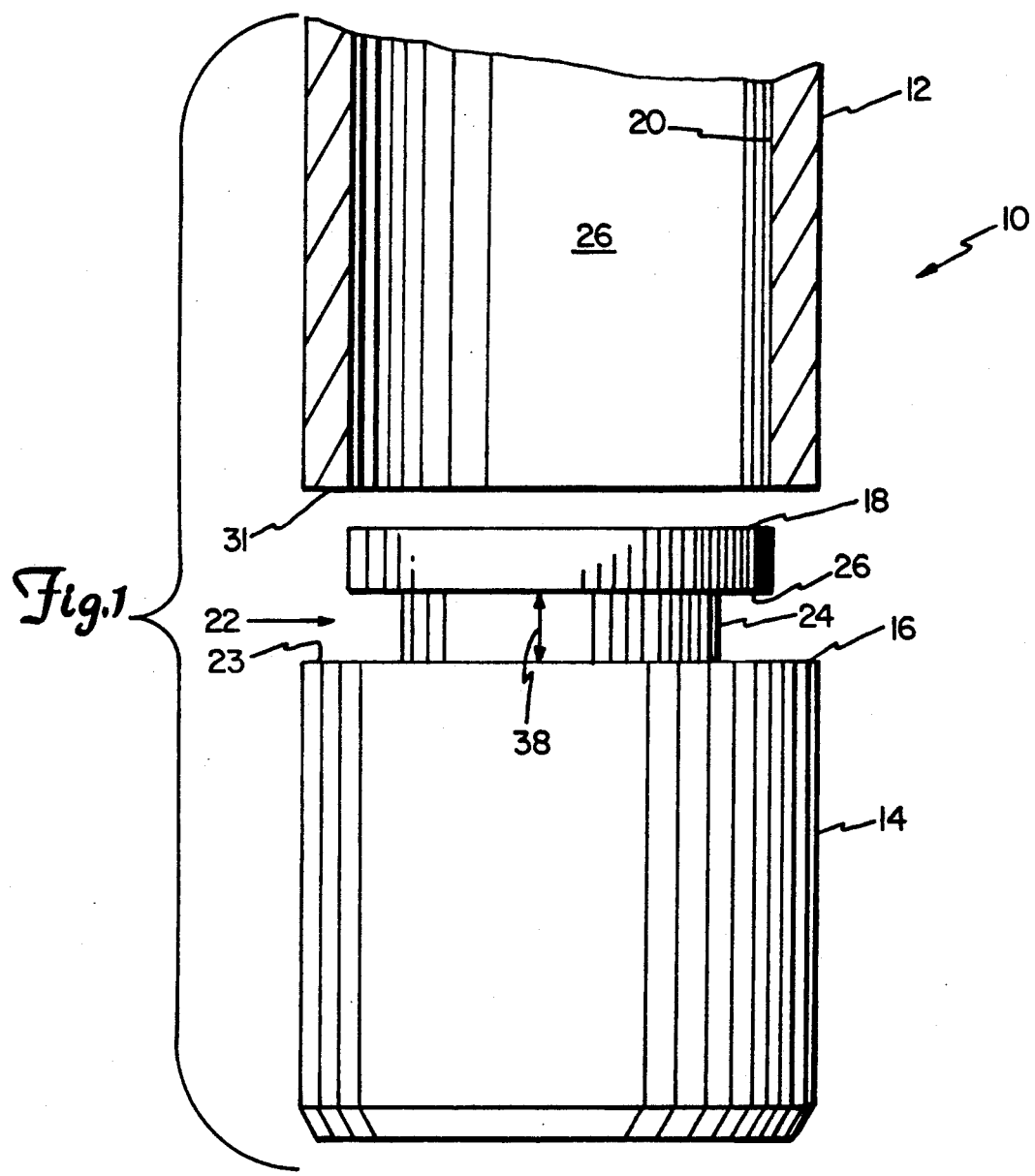
FIG. 1 is a schematic exploded view of a hydraulic cylinder tube and end cap positioned prior to the inertial welding.

FIG. 1 illustrates a fragmentary representation of a fluid pressure actuator assembly indicated generally at 10 prior to assembly. The actuator assembly 10 includes a tube or cylinder 12, that forms a fluid tight cylinder, and with a piston operating on the interior. The piston carries seals and can tolerate no foreign materials such as chips or slag loosening from welds. An actuator base end cap 14 is used for sealing a base end of the cylinder 12. The cap is inertial welded to the tube or cylinder 12. The base end cap 14 has a shoulder surface 16 that extends from the outer diameter of the cap inwardly, and forms a head or plug 18 that is of a size to slip fit within the inner surface 20 of the cylinder 12. The head 18 is provided with an annular groove indicated generally at 22. The groove 22 is formed by on side surface 23 that is an extension of (co-planer with) the shoulder surface 16 inwardly to an inner annular or circular end surface 24. The groove is further defined by a surface 26 parallel to the shoulder surface 16 and spaced axially from the shoulder surface 16 and surface 23, a selected distance.

Figure 2:
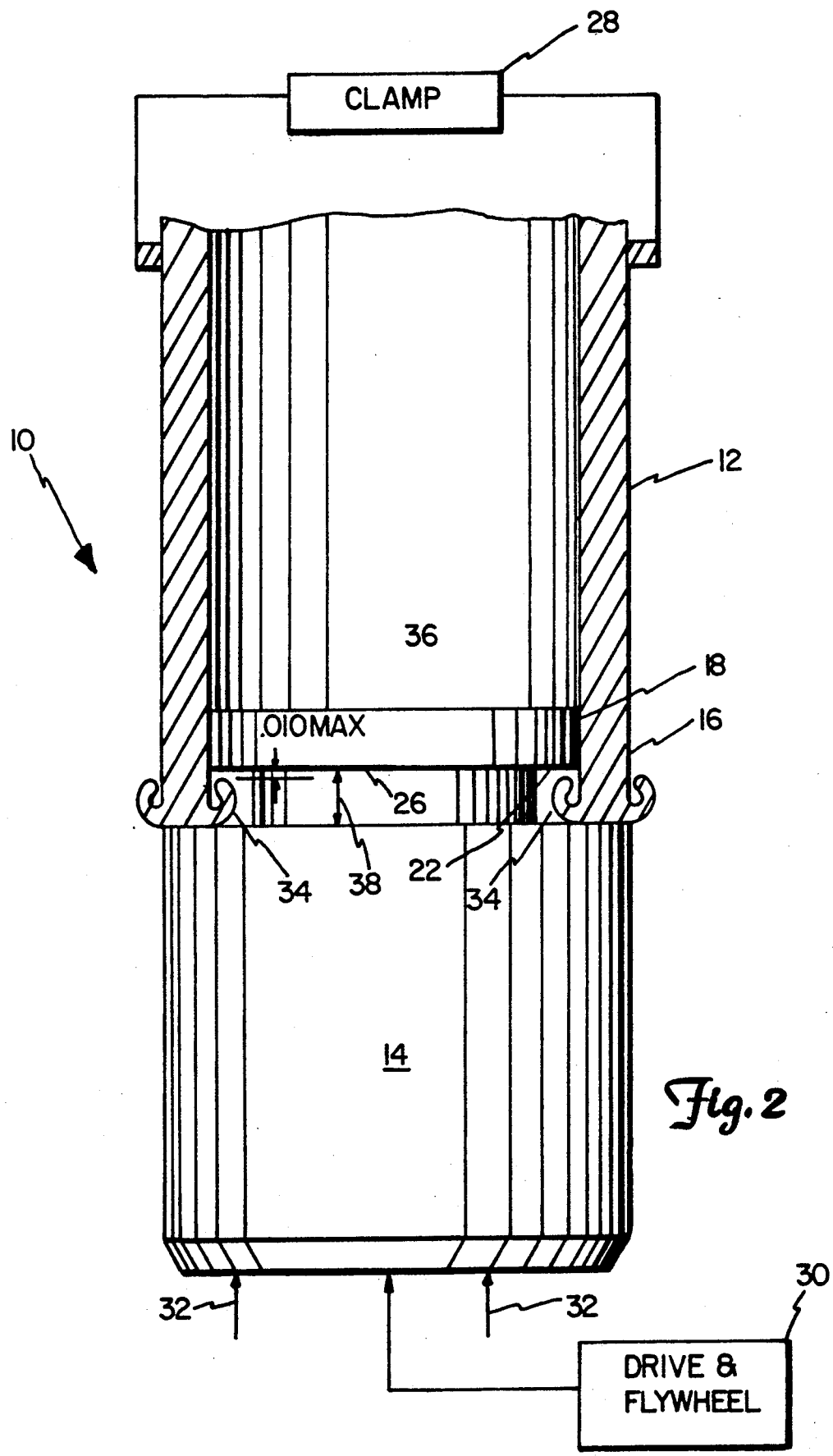
FIG. 2 is a view showing the arrangement of the present invention after welding.

The axial length of the cylinder, that is length in direction along its central axis 26 is selected to be just slightly longer than the overall length of the cylinder that is necessary after welding. The inertial welding is accomplished to make an actuator assembly as shown in FIG. 2. The tube or cylinder is clamped with a suitable clamp illustrated schematically at 28, while the end cap or base is rotated using a flywheel drive 30, while the base and cylinder are forced together with an axial force in direction as indicated by the arrows 32. The friction generated by the rotation causes the end surface - 31 (FIG. 1) of the cylinder or tube to be upset and flow to form a "kerf" or flash which essentially flows in both directions from the tube wall. The inner kerf curl indicated at 34 will flow into the groove 22, as shown. The kerf size and axial length is predicable within 0.015 (±0.075) to 0.020 (±0.010) inches. The kerf size depends somewhat on the rotational speed of the drive 30, the mass of the flywheel forming part of the drive 30, and also the force or pressure exerted as indicated by arrow 32.

The kerf 34 contains and carries small particulate matter that can break away and cause problems on the inside of a cylinder in use, and while such particulate material is inherent in friction welding, it has been discovered that by properly sizing the groove 22 in relation to the predicable size of the kerf, the kerf will close the groove and prevent materials from getting into the interior of the cylinder during use. The head member 18 has an outer peripheral surface 36 that is sized to provide a very small clearance with respect to the interior surface of the tube 12, but because of variation of tube sizes the fit cannot be made close in that area to seal the material in the groove. The axial height of the groove 22, which is the dimension between the shoulder surface 16 and the surface 26, is selected for proper operation. This height dimension is indicated at 38 in FIG. 2 and can be closely controlled when the groove is machined, as can the radial depth of the groove 22, which is the dimension from the outer surface 36 to the inner annular or circular surface 24 forming the inner end of the groove around the axis.

The amount of material forming the kerf can be predicted as stated, because the kerf curl size is determined in large part by the amount of material that is caused to flow during the inertial welding process. The kerf material is produced by the shortening of the tube during welding. It has been found that the height of the weld curl or kerf from the shoulder surface 16 can be predicted quite accurately as well. The spacing between the upper edge of the kerf and the surface 26 is selected to be such that there is no greater gap than 0.010 inches. This can be controlled by insuring that the kerf does not contact the inner annular surface defining the groove which is indicated as surface 24. The kerf size can be predicted by determining the correct upset or shortening of the tube as well as the tube materials and factors involved in the inertial welding. The kerf can be predicted to within about 0.020 (±10) inches. There should be no more than 0.010 gap in the groove. The present method of forming and welding is designed to provide for between a 0.010 gap and a complete seal on the surface 26 of the groove or pocket.

It is again desired that the inner end surface of the groove, indicated at 24 not interfere at all with the forming of the kerf and that the kerf be free to curl and move toward the surface 26. The kerf size can be determined by calculation or by experimentation, their axial length of the groove selected to provide the desired clearances.

Thus, by properly dimensioning the recess or groove in relation to the amount of upset of the tube during welding, and consequently the size of the kerf that will be formed during the inertial welding operation, foreign materials can be blocked from entering the interior of the actuator cylinder or tube.

Although the present invention has been described with reference to preferred embodiments, workers skilled in the art will recognize that changes may be made in form and detail without departing from the spirit and scope of the invention.

What is claimed is:

1. A method of assembling an inertial welded cylinder tube to a base that effectively traps a welding kerf formed between the cylinder tube and the base during inertial welding by trapping an internal weld kerf formed at the end of the cylinder tube during inertial welding, comprising the steps of providing said base with a shoulder surface forming a center head member, the shoulder surface receiving an end surface of said cylinder tube to be welded thereto; providing a groove extending radially inwardly from an outer surface of the head member, the head member fitting inside the cylinder tube; placing said cylinder tube around the head member and against the shoulder; rotating the base relative to the cylinder tube under force to fuse the cylinder tube and base and to form a weld kerf inside the groove, and continuing the rotation to cause the kerf to flow and curl toward a surface of the groove facing in a direction toward the shoulder to effect a closure relative to said surface of the groove facing in direction toward the shoulder; and determining the kerf size formed by the inertial welding of the end of the cylinder tube to the shoulder on the base and selecting a groove having an axial length measured parallel to one axis of rotation of the base relative to the cylinder tube which provides for no greater gap than 0.010 inch any place between the kerf and the groove surface which is spaced from and facing the shoulder; and providing a clearance spacing relative to a circular surface defining the inner end of the groove which insures that the kerf will not contact such inner end circular surface.

2. The method of claim 1, including the step of causing fusion of the weld kerf on the inside of the annular groove on the base.

3. An improved method of producing a friction welded part by producing a friction weld between a hollow cylindrical part having a longitudinal axis, and a second end part, said second end part having a shoulder surrounding a head member of smaller diameter than the outer diameter of the shoulder, the head member having an outer circular surface, the shoulder receiving an end surface of said hollow cylindrical part with the head member inside the hollow cylindrical part, the second end part having a clearance groove extending inwardly from the outer surface of the head member, the clearance groove being defined by a continuation of the shoulder inwardly of the outer surface of the head member, and by a second surface parallel to the shoulder and spaced therefrom in an axial direction, and by an internal end surface of smaller diameter than the outer surface of the head member, said head member fitting inside the hollow cylindrical part, the method comprising the steps of rotating the second end part and the hollow cylindrical part relative to each other while the hollow cylindrical part is held against said shoulder to fuse the parts and form a kerf that goes inwardly from the hollow cylindrical part, and further including the step of determining the size of the kerf for a particular inertial welding operation, spacing the second surface of the groove from the shoulder a selected amount to insure a spacing between the formed kerf and the second surface of no more than 0.010 inches from the second surface after inertial welding, and providing the internal end surface defining the inner end of the groove at position to be inwardly of the kerf when the hollow cylindrical part and second end part are welded to avoid contact of the kerf and the internal end surface of the groove.

4. An inertial welded fluid pressure actuator comprising a cylinder tube and an end member closing one end of the cylinder tube, the cylinder tube having a longitudinal central axis, the cylinder tube and the end member being inertially welded together by rotating the end member relative to the cylinder tube under a desired friction compression force, which forms a kerf of known dimension caused by flowing material during the welding process, and a peripheral recess formed around the end member and positioned on the interior of the cylinder tube and aligned with the kerf, said recess comprising a continuous groove that has a pair of parallel surfaces, one of the parallel surfaces being a continuation inwardly toward a central axis of a shoulder surface on the end member which is welded to an end of the cylinder tube, and the other of the parallel surfaces being substantially parallel to the one surface and spaced therefrom a distance so that the kerf is no more than 0.010 inches from the second mentioned surface when the welding is completed, and the groove having an inner end surface around the axis of the cylinder tube defining an inner end of said groove and the inner end surface being spaced inwardly from the kerf all around the inner end surface.

* * * * *